United States Patent
Park et al.

(10) Patent No.: US 11,928,256 B2
(45) Date of Patent: Mar. 12, 2024

(54) ELECTRONIC DEVICE USING EXTERNAL DEVICE AND OPERATION

(71) Applicant: SAMSUNG ELECTRONICS CO., LTD., Suwon-si (KR)

(72) Inventors: Namjoon Park, Suwon-si (KR); Jinik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/967,609

(22) Filed: Oct. 17, 2022

(65) Prior Publication Data

US 2023/0118074 A1  Apr. 20, 2023

Related U.S. Application Data

(63) Continuation of application No. PCT/KR2022/013387, filed on Sep. 6, 2022.

(30) Foreign Application Priority Data

Oct. 20, 2021 (KR) .................. 10-2021-0140501

(51) Int. Cl.
  *G06F 3/01* (2006.01)
  *G01S 5/02* (2010.01)
  (Continued)

(52) U.S. Cl.
  CPC ............ *G06F 3/012* (2013.01); *G01S 5/0247* (2013.01); *G06F 3/0346* (2013.01);
  (Continued)

(58) Field of Classification Search
  CPC ........ G06F 3/012; G06F 3/0346; G06F 3/013; G01S 5/0247; H04R 1/1016;
  (Continued)

(56) References Cited

U.S. PATENT DOCUMENTS 9,529,428 B1  12/2016  Bhattacharya et al.
10,113,877 B1  10/2018  Schaefer
(Continued)

FOREIGN PATENT DOCUMENTS

JP  2007-163634 A  6/2007
JP  2011-150631 A  8/2011
(Continued)

OTHER PUBLICATIONS

International Search Report (PCT/ISA/210) issued by the International Searching Authority dated Dec. 13, 2022 in International Application No. PCT/KR2022/013387.
(Continued)

*Primary Examiner* — Temesghen Ghebretinsae
*Assistant Examiner* — Ivelisse Martinez Quiles
(74) *Attorney, Agent, or Firm* — Sughrue Mion, PLLC

(57) ABSTRACT

An electronic device includes a sensor; a memory storing instructions; and a processor configured to execute the instructions to: estimate a field of view (FOV) of a user by using another sensor included in a wireless earphone; estimate a FOV of the electronic device by using the sensor; compare the estimated FOV of the user with the estimated FOV of the electronic device; determine whether the user gazes at a screen of the electronic device based on the comparison result; recognize a gaze of the user based on determining that the user gazes at the screen of the electronic device; and perform a specified function based on the gaze of the user.

20 Claims, 20 Drawing Sheets

(51) Int. Cl.
*G06F 3/0346* (2013.01)
*H04R 1/10* (2006.01)
(52) U.S. Cl.
CPC ......... *H04R 1/1016* (2013.01); *H04R 1/1041* (2013.01); *H04R 2420/07* (2013.01)
(58) Field of Classification Search
CPC .. H04R 1/1041; H04R 2420/07; H04R 5/033; H04R 1/1091; H04S 7/304
See application file for complete search history.

(56) References Cited

U.S. PATENT DOCUMENTS

| | | | |
|---|---|---|---|
| 10,206,042 B2* | 2/2019 | Hviid | ..................... H04S 7/304 |
| 2007/0132663 A1 | 6/2007 | Iba et al. | |
| 2009/0219224 A1 | 9/2009 | Elg | |
| 2016/0327405 A1 | 11/2016 | Kim et al. | |
| 2020/0252740 A1* | 8/2020 | Hammerschmidt | .... H04S 7/304 |
| 2021/0174589 A1 | 6/2021 | Emery et al. | |
| 2022/0277425 A1* | 9/2022 | Ikenoue | .................. G06F 3/016 |
| 2023/0199413 A1* | 6/2023 | Komeilipoor | ........ H04R 25/507 381/313 |

FOREIGN PATENT DOCUMENTS

| | | |
|---|---|---|
| KR | 10-1648374 B1 | 8/2016 |
| KR | 10-1831968 B1 | 4/2018 |
| KR | 10-2021-0031221 A | 3/2021 |

OTHER PUBLICATIONS

Written Opinion (PCT/ISA/237) issued by the International Searching Authority dated Dec. 13, 2022 in International Application No. PCT/KR2022/013387.

* cited by examiner

ELECTRONIC DEVICE USING EXTERNAL DEVICE AND OPERATION

CROSS-REFERENCE TO RELATED APPLICATIONS

This application is a continuation application of International Application No. PCT/KR2022/013387, filed on Sep. 6, 2022, which claims priority to Korean Patent Application No. 10-2021-0140501, filed on Oct. 20, 2021, in the Korean Intellectual Property Office, the disclosures of which are incorporated by reference herein in their entireties.

BACKGROUND

1. Field

The disclosure relates to an electronic device using an external device and a method thereof.

2. Description of Related Art

User interfaces of electronic devices are being diversified with the advancement of technology. Although input from software keys or hardware keys has been mainly used as user interfaces, user interfaces using sensors are being diversified as electronic devices can include various sensors. For example, an electronic device may identify the iris of the user by using a camera to thereby unlock itself or execute a designated application.

As electronic devices can include various configurations and the number of functions that can be performed increases, power consumption is also rapidly increasing. In particular, since a camera may consume a large amount of power, it may be difficult to utilize a function using the camera for a long time. Various embodiments of the disclosure may provide a method for replacing a function using a camera with a function using a sensor other than a camera, and an electronic device using the same.

SUMMARY

According to an aspect of the disclosure, an electronic device includes: a sensor; a memory storing instructions; and a processor configured to execute the instructions to: estimate a field of view (FOV) of a user by using another sensor included in a wireless earphone; estimate a FOV of the electronic device by using the sensor; compare the estimated FOV of the user with the estimated FOV of the electronic device; determine whether the user gazes at a screen of the electronic device based on the comparison result; recognize a gaze of the user based on determining that the user gazes at the screen of the electronic device; and perform a specified function based on the gaze of the user.

According to an aspect of the disclosure, a wireless earphone includes: a sensor; a memory storing instructions; and a processor configured to execute the instructions to: estimate a posture of the wireless earphone based on data obtained using the sensor; estimate a posture of a head of a user based on the posture of the wireless earphone; and estimate a field of view (FOV) of the user based on the posture of the head of the user.

According to an aspect of the disclosure, an operation method of an electronic device includes: estimating a field of view (FOV) of a user by using a first sensor included in a wireless earphone; estimating a FOV of the electronic device by using a second sensor included in the electronic device; comparing the estimated FOV of the user with the estimated FOV of the electronic device; determining whether the user gazes at a screen of the electronic device based on the comparing; recognizing a gaze of the user based on determining that the user gazes at the screen of the electronic device; and performing a specified function of the electronic device based on the gaze of the user.

According to an aspect of the disclosure, an operation method of a wireless earphone, the operation method includes: estimating a posture of the wireless earphone based on data obtained using a sensor; estimating a posture of a head of a user based on the posture of the wireless earphone; and estimating a field of view (FOV) of the user based on the posture of the head of the user.

According to one or more embodiments of the disclosure, an electronic device may identify whether the user is looking at the electronic device without using a camera.

According to one or more embodiments of the disclosure, an electronic device may confirm face recognition and/or gaze recognition without using a camera or using a camera only when necessary, so that power (e.g., current) consumption of the electronic device can be reduced. When the consumption of current is reduced, the lifespan of the battery can be extended and the amount of heat generated by the electronic device can be reduced.

According to one or more embodiments of the disclosure, an electronic device may always run the face recognition and/or gaze recognition function if the current consumption for confirming the face recognition and/or gaze recognition is small. When the face recognition and/or gaze recognition function is always run, the initial driving time required to run an application using the face recognition and/or gaze recognition function may be reduced.

According to various embodiments of the disclosure, privacy can be protected by not using a camera.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
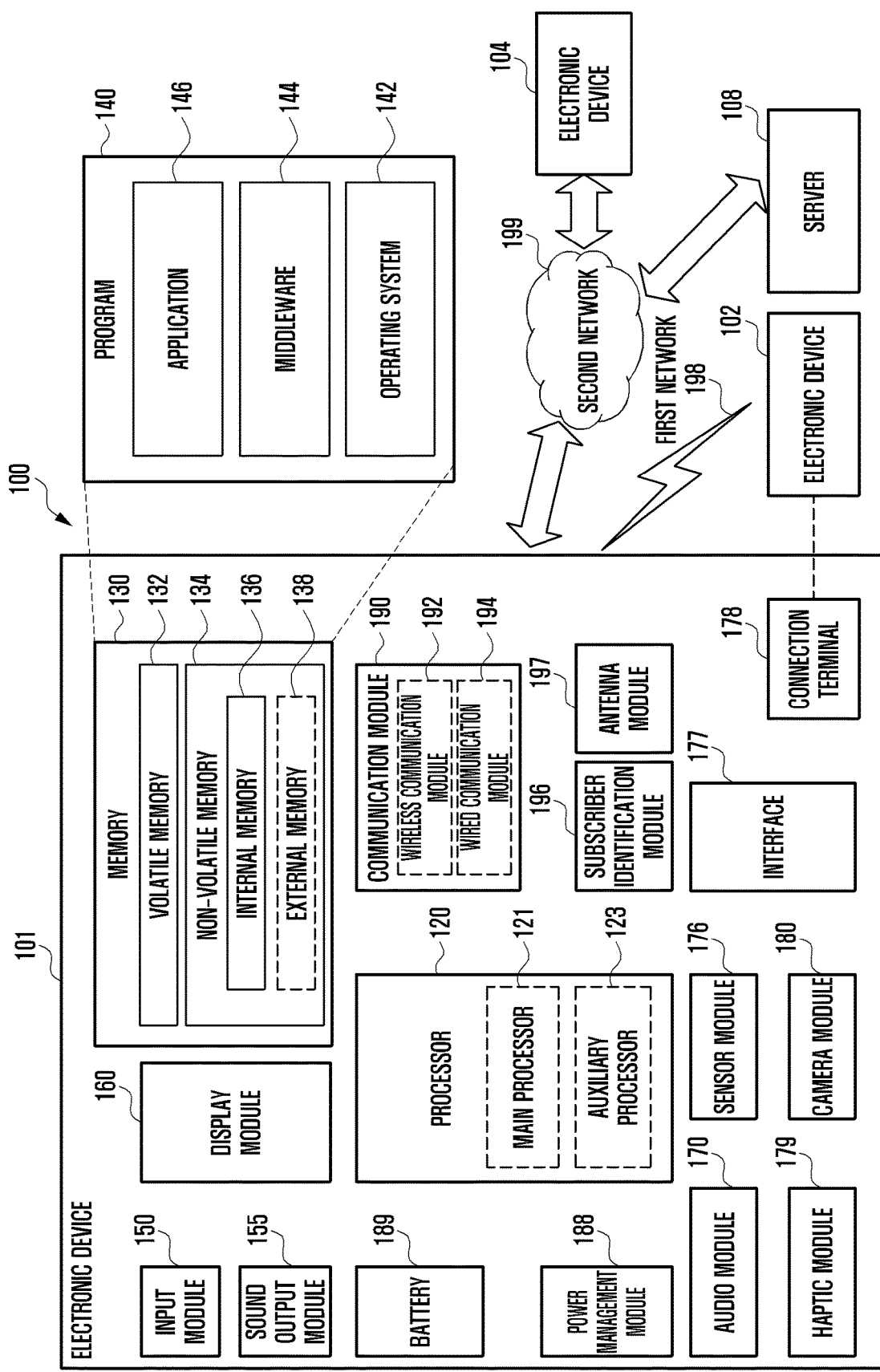
FIG. 1 is a block diagram of an electronic device in a network environment according to various embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
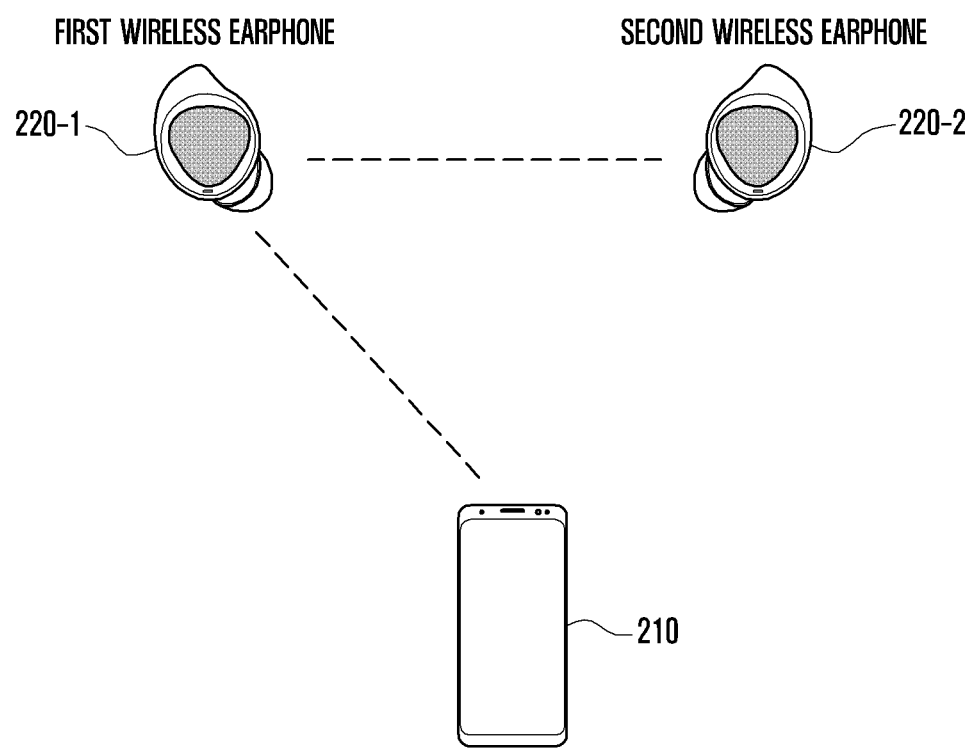
FIG. 2 illustrates an electronic device connectable to an external device according to various embodiments.

FIG. 2 illustrates an electronic device connectable to an external device according to various embodiments.

According to an embodiment, the electronic device 210 (e.g., electronic device 101 in FIG. 1) may be connected to wireless earphones 220 (e.g., electronic device 102 in FIG. 1) being an external device. The wireless earphones 220 may be composed of a first wireless earphone 220-1 and a second wireless earphone 220-2. The first wireless earphone 220-1 and the second wireless earphone 220-2 may be worn on both ears of the user, and the right and left sides may be distinguished. One of the first wireless earphone 220-1 and the second wireless earphone 220-2 may play a primary role, and the other may play a secondary role. The wireless earphone playing the primary role may be directly connected to the electronic device 210. With reference to FIG. 2, the first wireless earphone 220-1 may play a primary role and may be directly connected to the electronic device 210. The wireless earphone playing the secondary role may be synchronized with the wireless earphone playing the primary role by transmitting and/or receiving signals (and/or data) to and/or from the wireless earphone playing the primary role. With reference to FIG. 2, the second wireless earphone 220-2 may be a wireless earphone playing a secondary role.

According to an embodiment, the first wireless earphone 220-1 may play a secondary role, and the second wireless earphone 220-2 may play a primary role. The roles of the wireless earphones may be switched with each other.

In various embodiments of the disclosure, wireless earphones are described as an external device, but a device that can be mounted on a user's head and include a sensor may be an external device described in various embodiments of the disclosure. For example, wired earphones, headphones, and/or smart glasses may be an external device.

In the disclosure, wireless earphones are described, but a wearable device that can be worn on the head (e.g., headband including at least some of a sensor, a processor, and a communication module) may also be applied.

Figure 3:
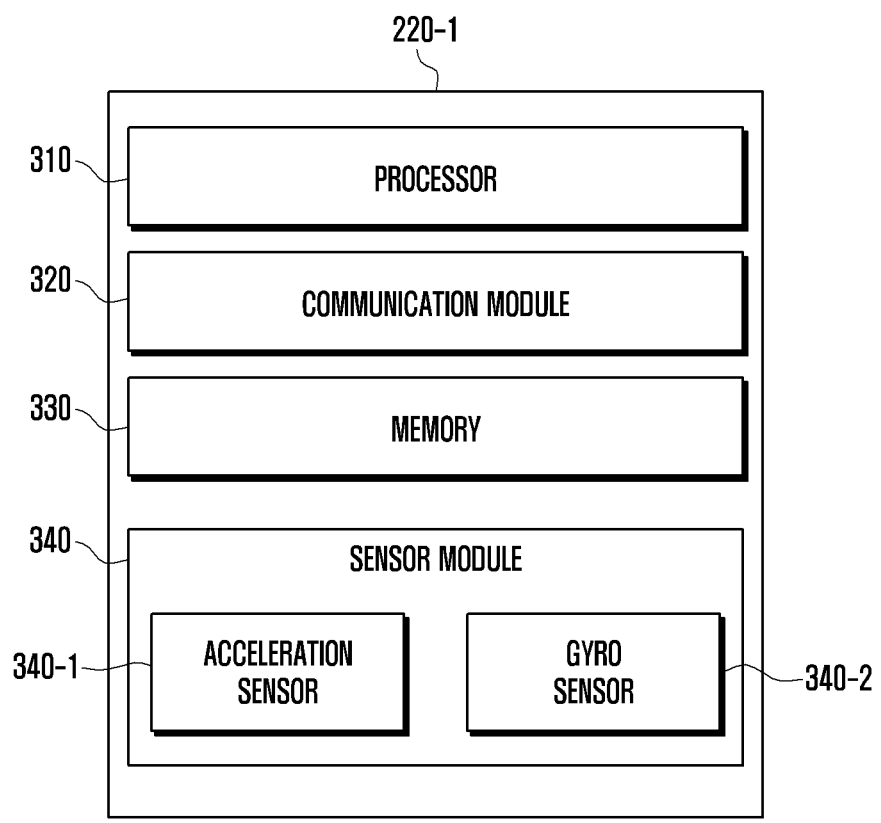
FIG. 3 is an internal block diagram of a wireless earphone according to various embodiments.

FIG. 3 is an internal block diagram of a wireless earphone according to various embodiments.

With reference to FIG. 3, the wireless earphone (e.g., first wireless earphone 220-1 in FIG. 2) may include a processor 310, a communication module (communication interface) 320, a memory 330, and/or a sensor module (sensor) 340.

According to an embodiment, the processor 310 may control the communication module 320 to process data and/or control signals received from the electronic device (e.g., electronic device 210 in FIG. 2). For example, when the processor 310 receives a control signal for volume adjustment by controlling the communication module 320, it may adjust the volume of a speaker. According to an embodiment, the processor 310 may process data measured using the sensor module 340. For example, the processor 310 may process data measured using the sensor module 340 to estimate the posture of the wireless earphone 220-1. The processor 310 may estimate the posture of the wireless earphone 220-1 in consideration of the direction (e.g., left or right) of the wireless earphone. The posture of the wireless earphone 220-1 may be represented in coordinate axes. According to an embodiment, when the wireless earphone 220-1 plays a primary role, the processor 310 may estimate the posture of the wireless earphone 220-1.

According to an embodiment, the communication module 320 may connect the wireless earphone 220-1 to the electronic device 210. The wireless earphone 220-1 and the electronic device 210 may be connected through Bluetooth communication, for example, and the communication module 320 may support Bluetooth communication and/or another short-range communication standard and/or protocol. When the wireless earphone 220-1 plays a secondary role, the communication module 320 may eavesdrop on the communication between the wireless earphone playing a primary role (e.g., second wireless earphone 220-2) and the electronic device 210 so as to be synchronized with the wireless earphone 220-2 playing the primary role. Alternatively or additionally, the communication module 320 may transmit the state of the wireless earphone 220-1 to the wireless earphone 220-2 playing the primary role. The communication module 320 may transmit the posture of the wireless earphone 220-1 estimated by the processor 310 to the electronic device 210.

According to an embodiment, the memory 330 may be configured to store the state of the wireless earphone 220-1. The processor 310 may store the currently set state of the wireless earphone 220-1 in the memory 330.

According to an embodiment, the sensor module 340 may include an acceleration sensor 340-1 and a gyro sensor 340-2. The processor 310 may process data received from the acceleration sensor 340-1 to estimate the acceleration of the wireless earphone 220-1. The processor 310 may process data received from the gyro sensor 340-2 to measure the rotational angular velocity of the wireless earphone 220-1 in one or more directions. The processor 310 may estimate the posture of the wireless earphone 220-1 by using the measured acceleration and rotational angular velocity of the wireless earphone 220-1.

Figure 4:
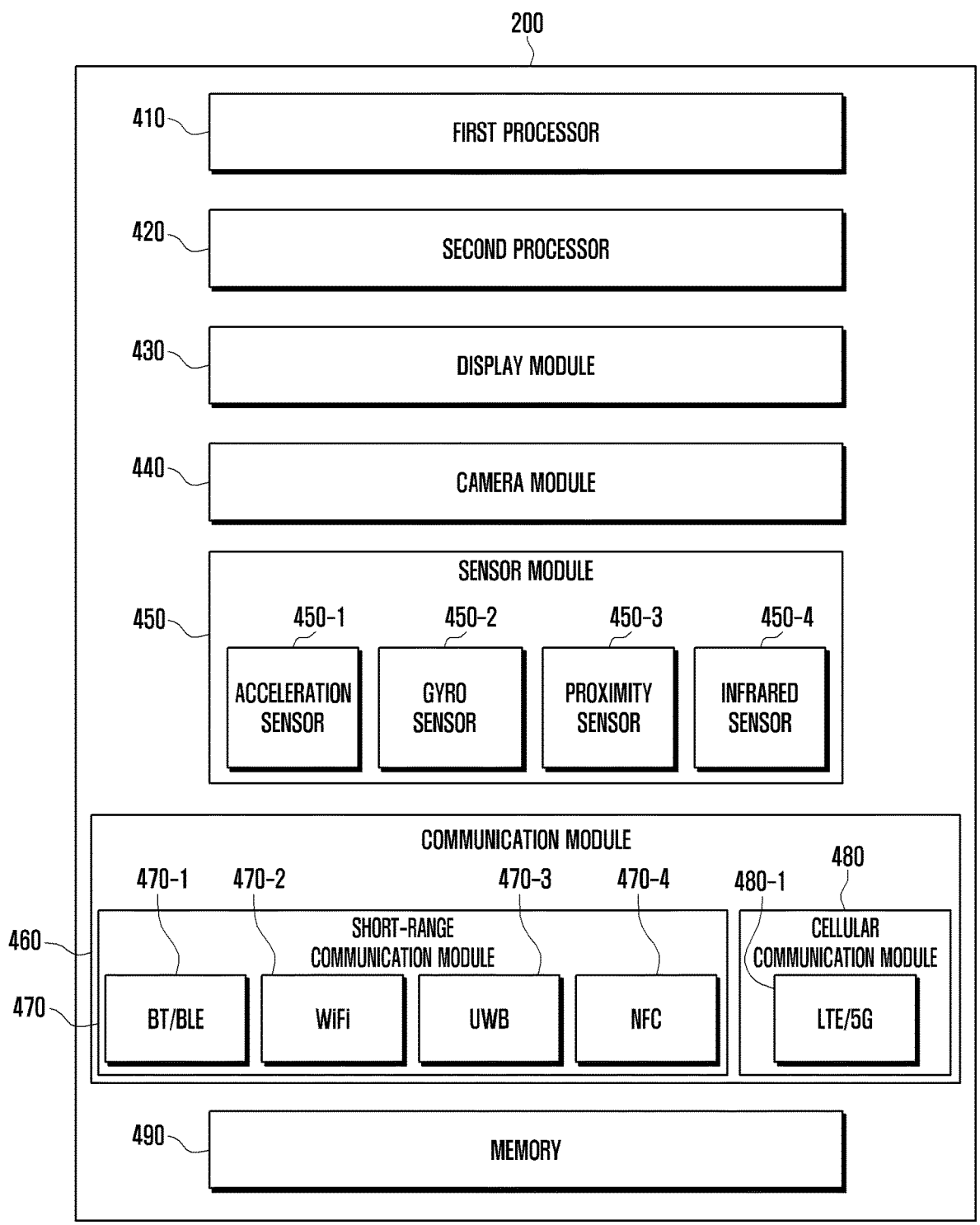
FIG. 4 is an internal block diagram of an electronic device according to various embodiments.

FIG. 4 is an internal block diagram of an electronic device according to various embodiments.

With reference to FIG. 4, the electronic device (e.g., electronic device 101 in FIG. 1 or electronic device 210 in FIG. 2) may include a first processor 410, a second processor 420, a display module 430, a camera module 440, a sensor module (sensor) 450, a communication module (communication interface) 460, and/or a memory 490.

According to an embodiment, the first processor 410 may be a higher performance processor than the second processor 420. The first processor 410 may be, for example, an application processor. The first processor 410 may execute an application (e.g., applications 146 in FIG. 1). The first processor 410 may be operably, functionally, and/or electrically connected to the second processor 420, the display module 430, and/or the camera module 440.

According to an embodiment, the second processor 420 may be a micro controller unit (MCU). The second processor 420 may be a processor capable of driving simple logics with low power. According to an embodiment, the second processor 420 may be operably, functionally, and/or electrically connected to the sensor module 450 and/or the communication module 460. When the electronic device 210 includes the first processor 410, the second processor 420 may be an optional component. If the second processor 420 is not included in the electronic device 210, those components (e.g., sensor module 450 and/or communication module 460) having been described as being connected to the second processor 420 may be operably, functionally, and/or electrically connected to the first processor 410.

According to an embodiment, the display module 430 may be a component to visually provide data to the user. The display module 430 may visually display data provided by a running application.

According to an embodiment, the camera module 440 may capture a still image and/or a moving image. For example, the camera module 440 may include red, green, blue (RGB) camera, a time-of-flight (TOF) camera, a depth camera, and/or a light detection and ranging (LiDAR) scanner. The first processor 410 may recognize the user's face by using the camera module 440 and recognize the eyeball (or gaze) of the user.

According to an embodiment, the sensor module 450 may include an acceleration sensor 450-1, a gyro sensor 450-2, a proximity sensor 450-3, and/or an infrared sensor 450-4.

According to an embodiment, the second processor 420 may measure the acceleration of the electronic device 210 by processing data received from the acceleration sensor 450-1.

According to an embodiment, the second processor 420 may measure the rotational angular velocity in one or more directions of the electronic device 210 by processing data received from the gyro sensor 450-2. The second processor 420 may estimate the posture of the electronic device 210 by using the measured acceleration and rotational angular velocity of the electronic device 210.

According to an embodiment, the configuration of the sensor module 450 for estimating the posture of the electronic device 210 may be not limited to the acceleration sensor 450-1 and/or the gyro sensor 450-2. For example, the sensor module 450 may further include a geomagnetic sensor and/or a barometric pressure sensor. The geomagnetic sensor may be used to determine the orientation of the electronic device 210, and the barometric pressure sensor may be used to measure the altitude of the electronic device 210.

According to an embodiment, the second processor 420 may determine whether the user's face is within a preset range from the electronic device 210 by using the proximity sensor 450-3. When the infrared (IR) sensor 450-4 (e.g., IR light-emitting diode (LED)) and the camera module 440 (e.g., iris scanner) are used, the electronic device 210 may recognize the user's iris.

According to another embodiment, the electronic device 210 may include a millimeter wave (mmWave) communication module (e.g., 60 GHz Wireless Fidelity (Wi-Fi)), and may determine whether the user's face is within a preset range from the electronic device 210 by using the mmWave communication module.

According to an embodiment, the communication module 460 may include a short-range communication module 470 and/or a cellular communication module 480.

According to an embodiment, the short-range communication module 470 may include, for example, a Bluetooth (BT)/Bluetooth low energy (BLE) module 470-1, a Wi-Fi module 470-2, an ultra-wideband (UWB) module 470-3, and/or a near field communication (NFC) module 470-4.

According to an embodiment, the BT/BLE module 470-1 may support Bluetooth communication so that the electronic device 210 may connect to an external device by using Bluetooth communication.

According to an embodiment, the Wi-Fi module 470-2 may support Wi-Fi communication. The electronic device 210 may connect to an external device by using Wi-Fi communication.

According to an embodiment, the UWB module 470-3 may support UWB communication. The UWB module 470-3 may include at least two UWB antennas (e.g., antenna module 197 in FIG. 1). The electronic device 210 may identify the location of an external device based on the round trip time (RTT) and angle-of-arrival (AOA) of radio frequency (RF) signals received through the UWB antennas from the external device. For example, after transmitting a distance measurement request message to the external device through the UWB antennas, the electronic device 210 may identify the round-trip time (RTT) required for receiving a response message as to the distance measurement request from the external device, and may identify the TOF, which is the time required for a radio wave to reach the external device after being emitted from the electronic device 210, based on the RTT. Through the TOF, the electronic device 210 may identify the relative distance between the electronic device 210 and the external device. Alternatively or additionally, the electronic device 210 may include at least three UWB antennas, the electronic device 210 may identify the angle of arrival (AOA) of the RF signals received from the external device based on the phase difference between the RF signals received by the UWB antennas from the external device and the physical distance between the spaced-apart UWB antennas, and may identify the direction in which the external device is located based on the angle of arrival (AOA). The electronic device 210 may measure the relative position between the electronic device 210 and the external device (e.g., distance to and/or angle with the external device) based on the TOF and AOA identified using UWB communication.

According to an embodiment, the NFC 470-4 may support short-range wireless communication. The NFC 470-4 may use a frequency of about 13.56 MHz to exchange data at a short distance within about 10 cm without contact, for example.

According to an embodiment, the cellular communication module 480 may include, for example, Long Term Evolution (LTE)/Fifth Generation (5G) module 480-1. The LTE/5G module 480-1 may support an LTE communication method and/or a 5G communication method. The electronic device 210 may communicate with a base station by using LTE communication/5G communication. According to an embodiment, the cellular communication module 480 may also support Second Generation (2G) and/or Third Generation (3G) communication schemes.

According to an embodiment, the memory 490 may temporarily and/or non-temporarily store information processed by the processor (e.g., first processor 410 and/or second processor 420). For example, the memory 490 may store location information of the external device based on the relative distance between the electronic device 210 and the external device and/or location information of the electronic device 210.

According to an embodiment, the memory 490 may store instructions that may be executed by the first processor 410 and/or the second processor 420, as described in various embodiments of the disclosure. The first processor 410 and/or the second processor 420 may operate by reading the instructions from the memory 490.

Figure 5A:
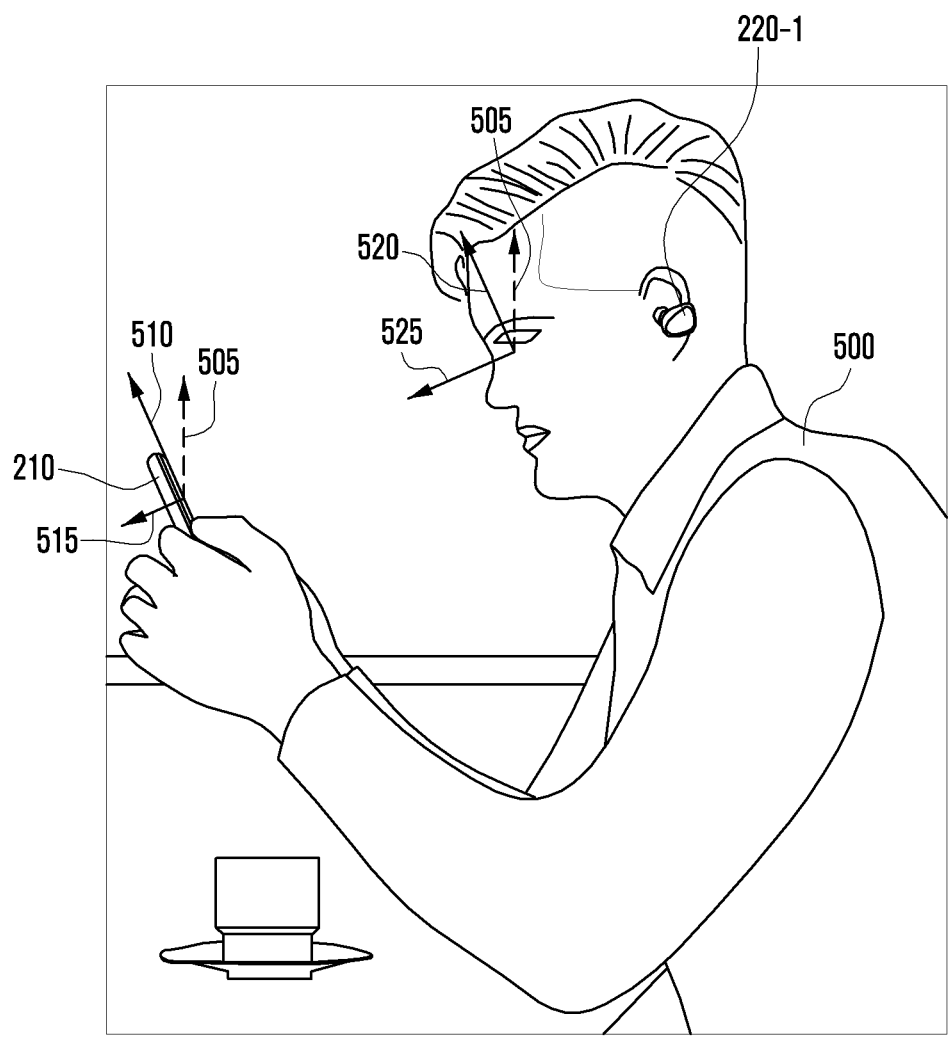
FIG. 5A is a diagram depicting a user gazing at the screen of an electronic device according to an embodiment.
Figure 5B:
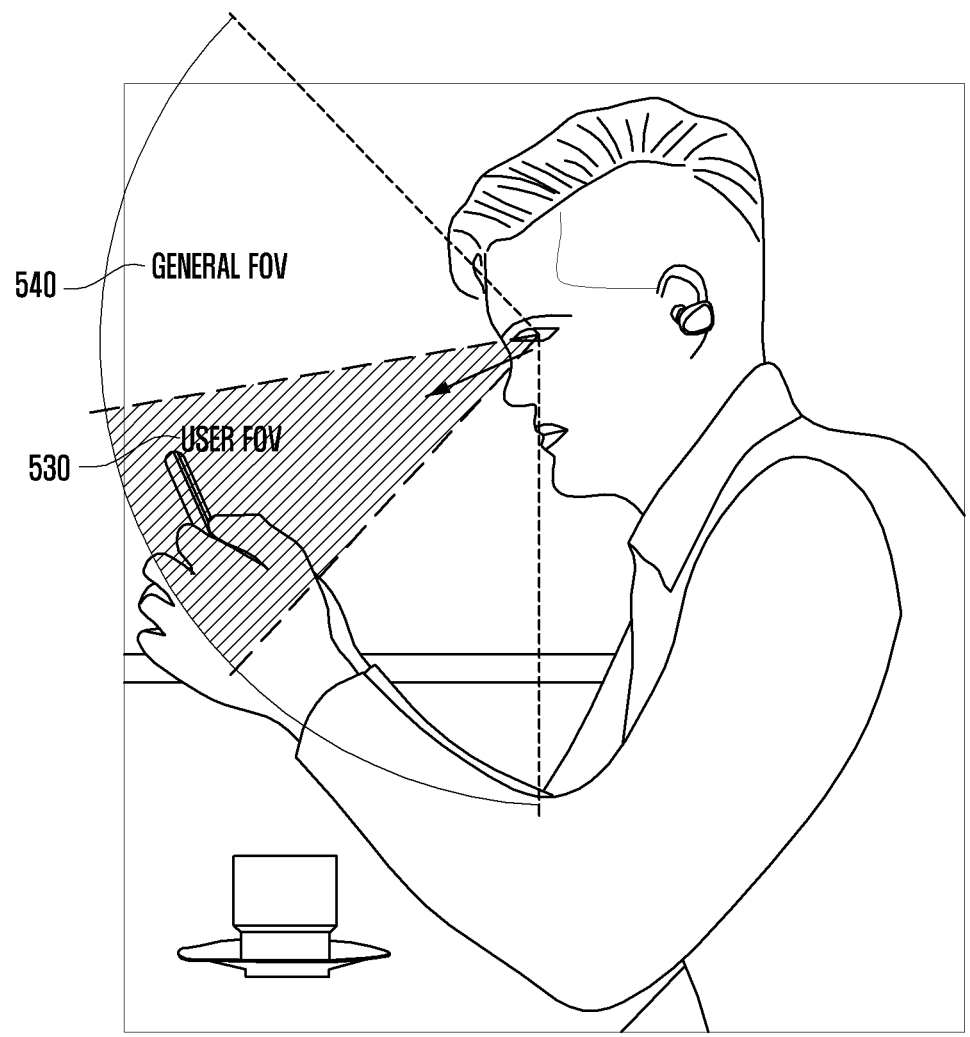
FIG. 5B is a diagram depicting a FOV of the user gazing at the electronic device in FIG. 5A.

FIG. 5A is a diagram depicting a user gazing at the screen of an electronic device according to an embodiment, and FIG. 5B is a diagram depicting a FOV of the user gazing at the electronic device in FIG. 5A.

With reference to FIG. 5A, the user 500 may use the electronic device (e.g., electronic device 210 in FIG. 2) while wearing the wireless earphone (e.g., first wireless earphone 220-1 in FIG. 2). For example, the user 500 may make a video call with another user by using the wireless earphone 220-1 and the electronic device 210. The user 500 may view a counterpart user's image (e.g., the image of the another user) by using the electronic device 210 while listening to a counterpart user's voice by using the wireless earphone 220-1. As another example, the user 500 may view images by using the wireless earphone 220-1 and the electronic device 210. The user 500 may listen to audio through the wireless earphone 220-1 while viewing images by using the electronic device 210.

According to an embodiment, for the user 500 to view the screen (or display) of the electronic device 210, the degree of inclination of the electronic device 210 and the degree of inclination of the user must be within a specific range with respect to the direction of gravity 505. In FIG. 5A, the degree of inclination of the electronic device with respect to the direction of gravity 505 is represented by a first vector 510 and the degree of inclination of the user is represented by a second vector 520.

In various embodiments of the disclosure, fields of view (FOVs) may be defined respectively for the user and the electronic device. The FOV of the electronic device may mean a range in which a face and/or gaze can be recognized through a camera and/or UWB, and the FOV of the user may mean a range that the user can observe with their eyes. In FIG. 5A, the vector serving as a reference for the FOV of the electronic device is indicated by a third vector 515, and the vector serving as a reference for the user's FOV is indicated by a fourth vector 525.

According to an embodiment, the third vector 515 may be a vector perpendicular to the screen of the electronic device 210. The angle between the third vector 515 and the direction of gravity 505 may be a tilt angle. According to an embodiment, the fourth vector 525 may be referred to as a gaze vector in the direction of the user's gaze.

According to an embodiment, the degree of inclination of the electronic device and the user may be represented by the first vector 510 and the second vector 520 with respect to the direction of gravity 505, but may also be represented by the third vector 515 and the fourth vector 525.

According to an embodiment, the FOV of the user may be subdivided and distinguished. With reference to FIG. 5B, a general FOV 540 may be a range that the user may observe with the eyes, and may be about 180 degrees. In various embodiments of the disclosure, the range that the user can see with an intention may be defined as a user FOV 530. For example, when the electronic device 210 is located within the user FOV 530, the user may focus on data displayed on the screen of the electronic device 210. The user FOV 530 may be further subdivided as shown in FIG. 7D below.

Figure 6:
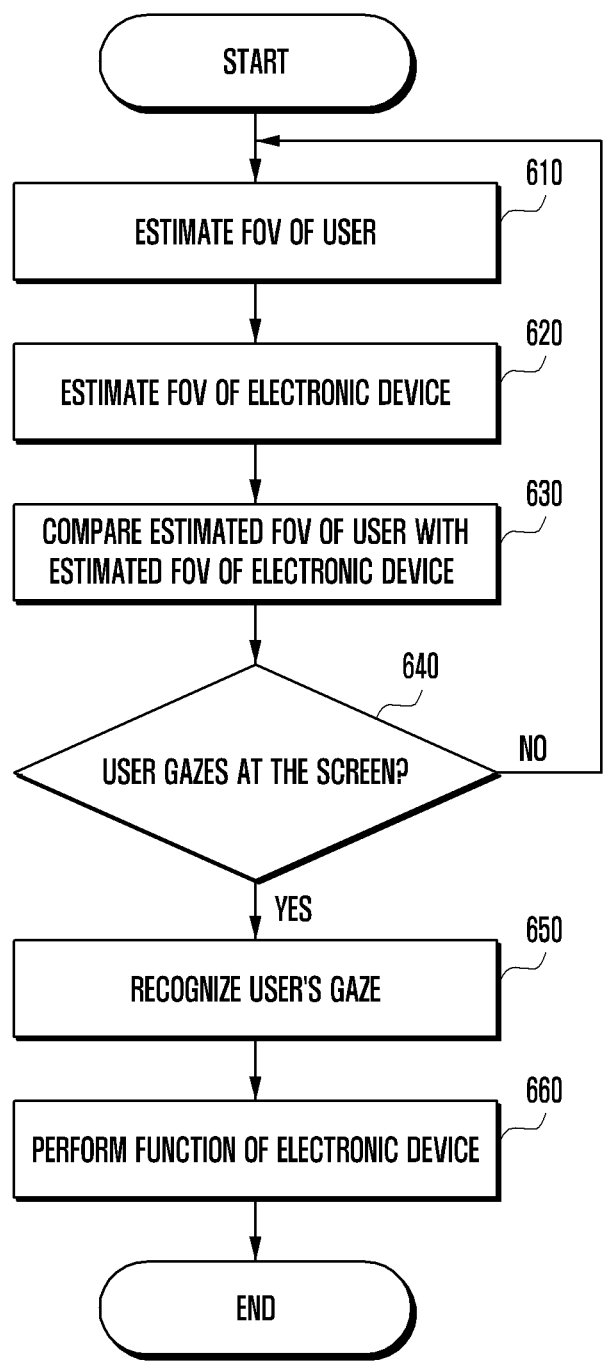
FIG. 6 is a flowchart of the electronic device according to various embodiments.

FIG. 6 is a flowchart of the electronic device according to various embodiments.

According to an embodiment, at operation 610, the electronic device (e.g., electronic device 210 in FIG. 2 or FIG. 4) may estimate the FOV of the user (e.g., user FOV 530 in FIG. 5B). The electronic device 210 may receive, through the communication module (e.g., communication module 460 in FIG. 4), data obtained by a sensor (e.g., sensor module 340 in FIG. 3) included in the wireless earphone (e.g., first wireless earphone 220-1 in FIG. 2 or 3), and estimate the FOV of the user. The electronic device 210 may receive, through the communication module, the FOV of the user estimated directly by the wireless earphone using data obtained from the sensor. A method for the electronic device 210 or the wireless earphone to estimate the user's FOV is described in detail below with reference to FIGS. 7A to 7D.

According to an embodiment, at operation 620, the electronic device 210 may estimate the FOV of the electronic device 210. As described in FIG. 5A, the FOV of the electronic device 210 may be a range in which the user's face and/or gaze can be recognized using a camera (e.g., camera module 440 in FIG. 4) included in the electronic device 210. When the electronic device 210 supports UWB communication by using the UWB (e.g., UWB 460-3 in FIG. 4), the FOV of the electronic device 210 may be a range in which the user's face and/or gaze can be recognized using the wireless earphone and UWB communication. A method by which the electronic device 210 estimates the FOV of the electronic device 210 is described in detail below with reference to FIGS. 8A and 8B.

According to an embodiment, at operation 630, the electronic device 210 may compare the estimated FOV of the user with the estimated FOV of the electronic device 210.

The electronic device 210 may compare the vector (e.g., third vector 515 in FIG. 5A) that is a reference of the user's FOV and the vector (e.g., fourth vector 525 in FIG. 5A) that is a reference of the FOV of the electronic device.

According to an embodiment, at operation 640, the electronic device 210 may determine whether the user gazes at the screen of the electronic device 210 based on the comparison result. When the estimated FOV of the user and the estimated FOV of the electronic device 210 fall within a preset range, the electronic device 210 may determine that the user is gazing at the screen of the electronic device 210. The electronic device 210 may compare the vector (e.g., third vector 515) that is a reference of the user's FOV with the vector (e.g., fourth vector 525) that is a reference of the FOV of the electronic device 210 to determine whether the two vectors are parallel or face each other with respect to the direction of gravity (e.g., direction of gravity 505 in FIG. 5A). When the difference between the two vectors is maintained within a specific range in consideration of various variables such as shaking of the electronic device 210, movement of the user's face, and/or movement of the user's eyes, the electronic device 210 may determine that the user gazes at the screen of the electronic device 210.

According to an embodiment, upon determining that the user gazes at the screen of the electronic device 210, at operation 650, the electronic device 210 may recognize the user's gaze. When it is determined that the user gazes at the screen of the electronic device 210, the electronic device 210 may determine whether it is possible to recognize the user's gaze by using at least some of the camera, the sensor, and the UWB communication module to recognize the user's gaze. If it is determined that the user does not gaze at the screen of the electronic device 210, the electronic device 210 may proceed to operation 610 again (e.g., 640 NO). A method by which the electronic device 210 determines whether the user gazes at the screen of the electronic device 210 is described in detail below with reference to FIGS. 10A to 10F.

According to an embodiment, at operation 660, the electronic device 210 may perform a specified function of the electronic device 210 based on the recognized user's gaze. When the user's gaze is recognized, the electronic device 210 may perform a specified function of the electronic device 210 based on the recognized user's gaze.

According to an embodiment, the electronic device 210 may determine whether the user's gaze is recognized only when the user gazes at the screen of the electronic device 210, and when the user's gaze is recognized, the electronic device 210 may perform a preset function of the electronic device 210 only through settings without user manipulation. As a result, the electronic device 210 may not have to determine whether the user's gaze is recognized, thereby reducing the consumption of current, and the user may not need to perform an action to execute a specified function (e.g., action to run an application).

Figure 7A:
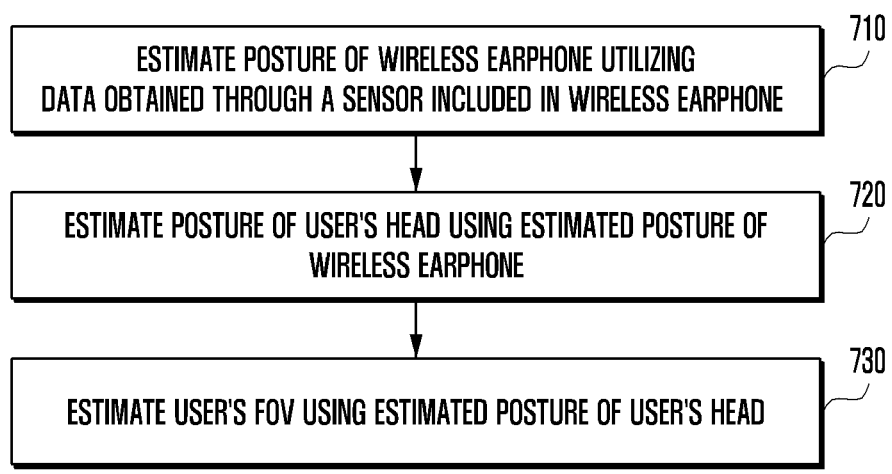
FIG. 7A is a flowchart for estimating a user's FOV according to various embodiments.

FIG. 7A is a flowchart for estimating a user's FOV according to various embodiments.

According to an embodiment, at operation 710, the electronic device (e.g., electronic device 210 in FIG. 2 or FIG. 4) may utilize data obtained through a sensor included in the wireless earphone (e.g., first wireless earphone 220-1 in FIG. 2 or FIG. 3) to estimate the posture of the wireless earphone. For example, the wireless earphone 220-1 may include an acceleration sensor (e.g., acceleration sensor 340-1 in FIG. 3) and a gyro sensor (e.g., gyro sensor 340-2 in FIG. 3). The processor (e.g., processor 310 in FIG. 3) of the wireless earphone 220-1 may use the acceleration sensor 340-1 to estimate the degree of inclination of the sensor axis of the wireless earphone 220-1 with respect to the direction of gravity. The processor 310 of the wireless earphone 220-1 may estimate the relative change in posture of the wireless earphone 220-1 by using the gyro sensor 340-2. According to an embodiment, the data measured using the gyro sensor 340-2 may be accurate for a short time, but may have a drift error when being integrated to obtain a value for a long time. The data measured using the acceleration sensor 340-1 may be inaccurate due to noise in a short moment, but the value for a long time may be accurate. By using the complementary characteristics of the gyro sensor 340-2 and the acceleration sensor 340-1, a relatively accurate posture of the wireless earphone 220-1 (or, the vector indicating the posture of the wireless earphone 220-1) can be estimated.

Figure 7B:
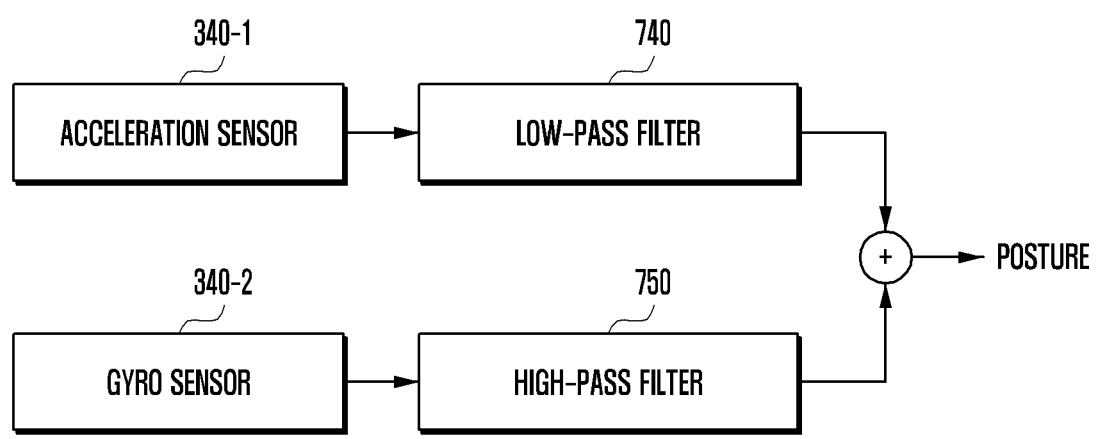
FIG. 7B shows an example of estimating the posture of the wireless earphone using a gyro sensor and an acceleration sensor.

FIG. 7B shows an example of estimating the posture of the wireless earphone using a gyro sensor and an acceleration sensor.

With reference to FIG. 7B, the data measured using the acceleration sensor 340-1 may include noise when there is no movement. Data measured using the acceleration sensor 340-1 may be used to identify a slow and large motion by removing noise with a low-pass filter 740. The data measured using the gyro sensor 340-2 may include a drift error when there is no movement. The data measured using the gyro sensor 340-2 may be used to identify a relatively small rotational motion by removing a drift error with a high-pass filter 750. By summing the data measured using the acceleration sensor 340-1 that has passed the low-pass filter 740 and the data measured using the gyro sensor 340-2 that has passed the high-pass filter 750, the posture of the wireless earphone 220-1 may be estimated with relatively high accuracy. The method shown in FIG. 7B may be a method using complementary filters, and extended Kalman filters, Mahony filters, and/or Madgwick filters may be used.

Such a method of estimating the posture of the wireless earphone 220-1 may be in consideration of the user's situation. For example, when the user gazes at the screen of the electronic device, as the user hardly moves the head, the stationary state of the user's head may be detected by the acceleration sensor 340-1, and the drift may be estimated with data measured using the gyro sensor 340-2. After the drift is estimated in this way, the estimated drift can be removed from the data measured using the sensor, so that the posture of the wireless earphone 220-1 can be estimated more accurately.

With reference back to FIG. 7A, according to an embodiment, at operation 720, the electronic device 210 may estimate the posture of the user's head (or, the vector representing the posture of the user's head) by using the estimated posture of the wireless earphone (or, the vector representing the posture of the wireless earphone). The vector representing the posture of the wireless earphone and the vector representing the posture of the user's head may be not the same. The posture of the wireless earphone may be different depending on the direction of the wireless earphone (e.g., right or left).

Figure 7C:
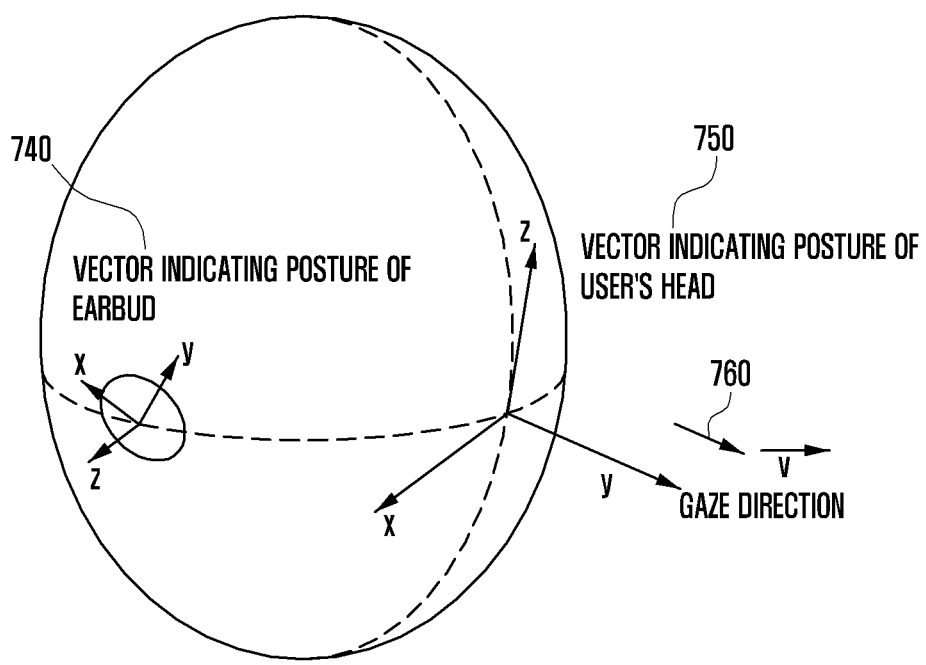
FIG. 7C shows an example of a vector indicating the posture of the wireless earphone and a vector indicating the posture of the user's head when the user wears the wireless earphone.
Figure 7D:
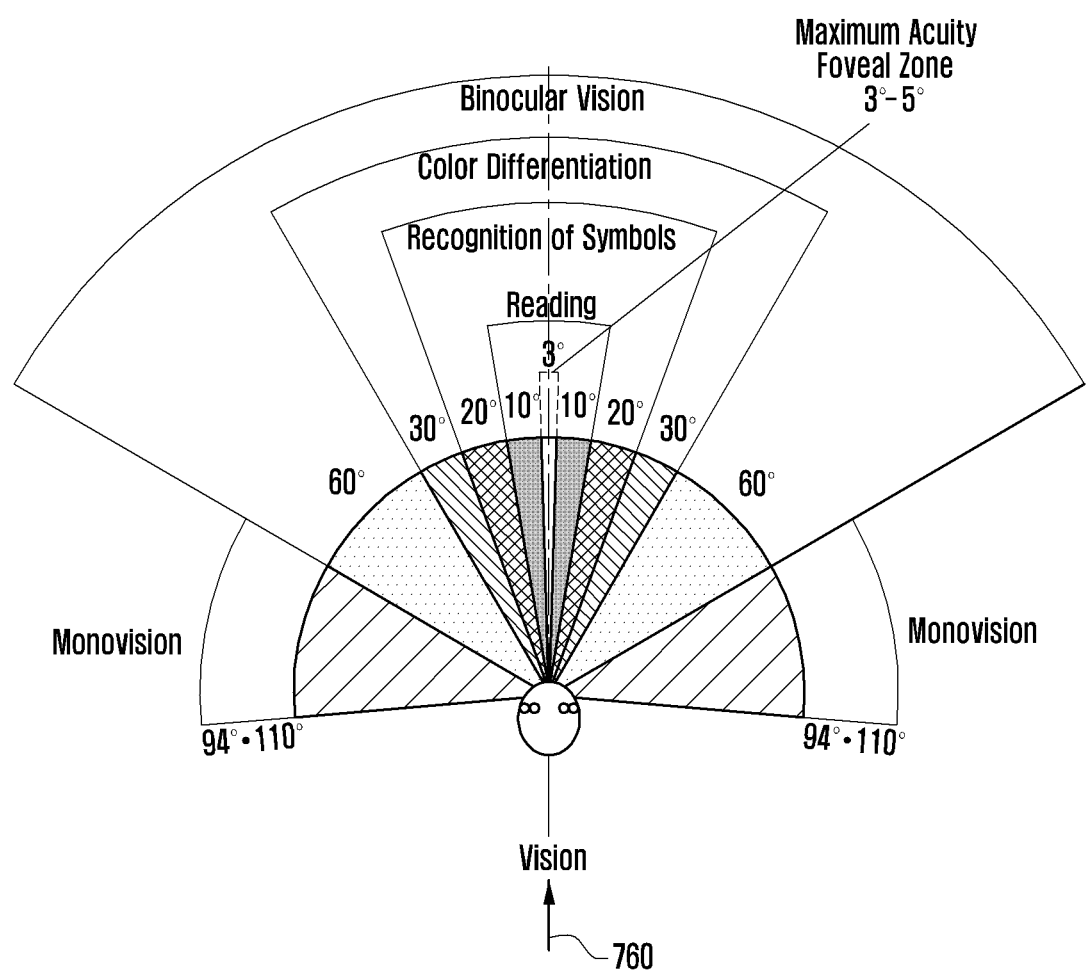
FIG. 7D shows various examples of a FOV of the user.

FIG. 7C shows an example of a vector 740 indicating the posture of the wireless earphone and a vector 750 indicating the posture of the user's head when the user wears the wireless earphone.

According to an embodiment, when the user wears the wireless earphone, the vector 740 indicating the posture of the wireless earphone and the vector 750 indicating the posture of the user's head may be represented by a constant relationship according to the mechanical characteristics of the wireless earphone. The electronic device 210 may estimate the vector 750 representing the posture of the user's head by using the vector 740 representing the estimated posture of the wireless earphone and a constant value.

According to an embodiment, the vector 750 indicating the posture of the user's head may be represented in quaternions, which is one of the schemes for representing the posture. The reference coordinate system representing the posture may be the Earth's local coordinate system (navigation frame), the vector 740 representing the posture of the wireless earphone may be represented by $q_E^N$, and the vector 750 representing the posture of the user's head may be represented by $q_H^N$. When the user is wearing the wireless earphone, the relationship between the vector 740 representing the posture of the wireless earphone and the vector 750 representing the posture of the user's head may be represented by $q_H^E$. When represented as described above, the vector 750 representing the posture of the user's head may be expressed as in Equation 1 below.

$$q_H^N = q_E^N \cdot q_H^E \quad \text{[Equation 1]}$$

Here, the relationship $q_H^E$ between the vector 740 indicating the posture of the wireless earphone and the vector 750 indicating the posture of the user's head when the user is wearing the wireless earphone may be a fixed value, and may vary depending on the direction of the wireless earphone.

According to an embodiment, the electronic device 210 may estimate the vector representing the front of the user's gaze by using the vector 750 representing the posture of the user's head. If the gaze direction vector 760 expressed in the vector 750 representing the posture of the user's head is $\vec{v}$, the gaze direction vector 760 $\vec{v}'$ expressed in the reference coordinate system can be represented as Equation 2.

$$\vec{v}' = q_H^N \cdot \vec{v} \cdot (q_H^N)^{-1} \quad \text{[Equation 2]}$$

According to an embodiment, at operation 730, the electronic device 210 may estimate the user FOV by using the vector 750 indicating the estimated posture of the user's head. The electronic device 210 may define a specific angular range with respect to the gaze direction vector 760 ($\vec{v}$) obtained at operation 720 as the user FOV.

FIG. 7D shows various examples of the FOV of the user.

With reference to FIG. 7D, the user can recognize text only when the text is within about +10 degrees with respect to the gaze direction vector 760. The user FOV that the user can recognize text can be defined as about +10. As another example, the user can recognize a symbol only when the symbol is within about +20 degrees with respect to the gaze direction vector 760, and the user can recognize a color only when the color is within about +30 degrees with respect to the gaze direction vector 760. According to an embodiment, the user FOV may be differently determined according to an application or function that the user intends to use. A plurality of user FOVs may be defined, and different user FOVs may be used according to applications or functions. For example, when the user intends to read an article by using an Internet browser, the user FOV may be based on about +10 degrees at which the user can recognize text. When the FOV of the electronic device (e.g., electronic device 210 in FIG. 2 or FIG. 4) deviates from the user FOV, the screen of the electronic device 210 may be blurred to prevent exposure of contents. When the FOV of the electronic device 210 falls within the user FOV, the screen of the electronic device 210 may be made clear. As another example, the user FOV for the user to view a video may be defined as about +20 degrees. When the FOV of the electronic device 210 deviates from the user FOV, the video may be stopped, when the FOV of the electronic device 210 falls within the user FOV, the video may be resumed. As another example, the user FOV for a reminder or notification function may be defined as about +30 degrees.

Although the electronic device 210 is described as estimating the user's FOV in FIG. 7A, the wireless earphone 220-1 may directly estimate the user's FOV by using data obtained from a sensor. When the wireless earphone 220-1 directly estimates the user's FOV, the wireless earphone 220-1 may transmit the estimated user's FOV to the electronic device 210. When the alarm sounds, if the FOV of the electronic device is within the user FOV (e.g., +30 degrees), the alarm can be stopped, and the contents of the reminder can be read or displayed. Furthermore, when the FOV of the electronic device falls within a more defined user FOV (e.g., +10 degrees), alarm confirmation (e.g., stopping the alarm) may be performed.

Figure 8A:
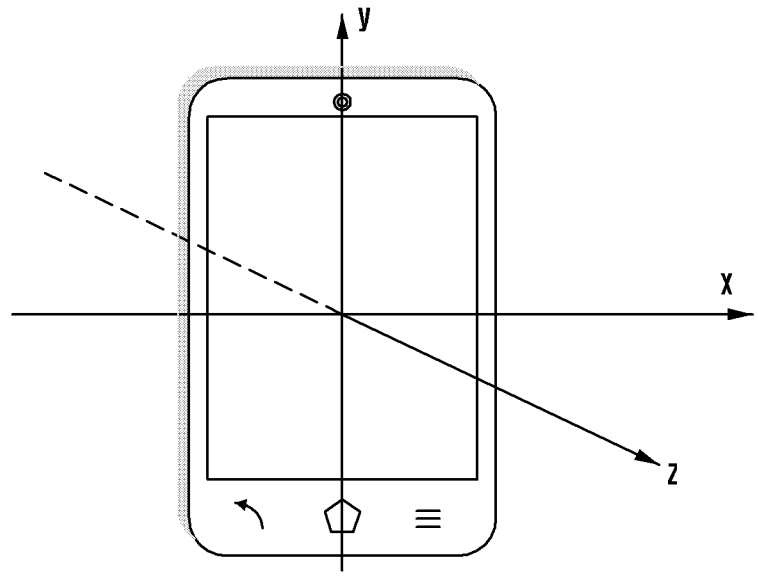
FIG. 8A illustrates coordinate axes for the posture of an electronic device according to various embodiments.
Figure 8B:
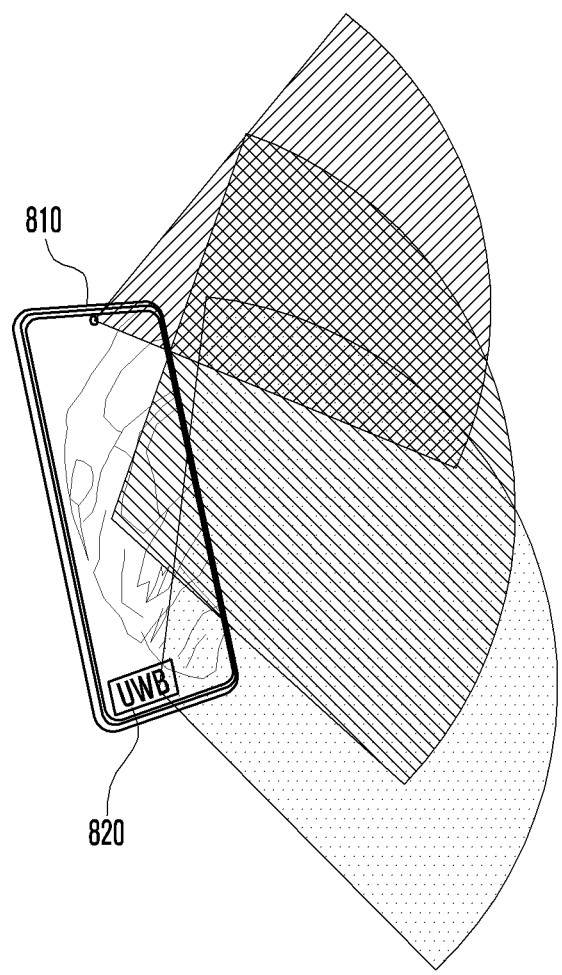
FIG. 8B illustrates a FOV of the electronic device according to an embodiment.

FIG. 8A illustrates coordinate axes for the posture of an electronic device according to an embodiment, and FIG. 8B illustrates a FOV of the electronic device according to an embodiment.

According to an embodiment, the electronic device (e.g., electronic device 210 in FIG. 2 or FIG. 4) may use data obtained by using a sensor included in the electronic device 210 to determine the posture of the electronic device 210 (or, the vector indicating the posture of the electronic device). The method for the electronic device 210 to estimate the posture of the electronic device 210 by using data acquired through a sensor included in the electronic device 210 may be the same as and/or similar to the method at operation 710 in FIG. 7A for the electronic device 210 to estimate the posture of the wireless earphone 220-1 (the vector indicating the posture of the wireless earphone 220-1) by using data obtained through a sensor included in the wireless earphone 220-1.

According to an embodiment, similarly to the vector representing the posture of the user's head, the vector representing the posture of the electronic device 210 may also represent the posture of the electronic device 210 in the Earth's local coordinate system. With reference to FIG. 8A, in a situation where the user views the screen from the front of the electronic device 210, the user's gaze vector may coincide with the −z axis among the coordinate axes for the posture of the electronic device 210. Hence, the screen direction vector of the electronic device 210 may be calculated by defining the vector d in the screen direction of the electronic device 210 as the −z axis and converting it into a reference coordinate system. The vector of the screen direction of the electronic device 210 can be represented as Equation 3 when expressed also in quaternions.

$$\vec{d}' = q_M^N \cdot \vec{d} \cdot (q_M^N)^{-1} \quad \text{[Equation 3]}$$

Here $q_M^N$ may be a vector for the posture of the electronic device represented in the reference coordinate system.

FIG. 8B shows various examples of the FOV of the electronic device as in FIG. 7D. The FOV of the electronic device 210 may vary according to the location of a sensor for estimating the posture of the electronic device 210. The range of the FOV of the electronic device 210 capable of recognizing the user's face and/or gaze by using the camera 810 included in the electronic device 210 may be different from the range of the FOV of the electronic device 210 in which the electronic device 210 may recognize the user's face and/or gaze by using the wireless earphone and the UWB communication 820.

Figure 9:
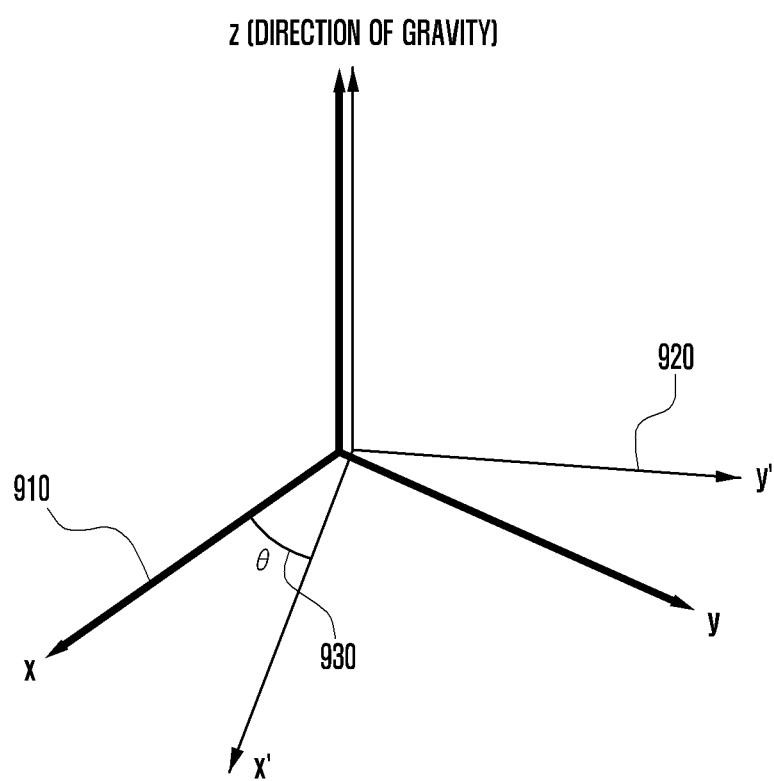
FIG. 9 is a diagram illustrating a reference coordinate system representing a gaze vector and a reference coordinate system representing a vector indicating a screen direction of the electronic device according to various embodiments.

FIG. 9 is a diagram illustrating a reference coordinate system representing a gaze vector and a reference coordinate system representing a vector indicating a screen direction of the electronic device according to various embodiments.

With reference to FIG. 9, the reference coordinate system 910 representing the gaze vector (e.g., fourth vector 525 in FIG. 5A) may not coincide with the reference coordinate system 920 representing the vector indicating the screen direction of the electronic device (e.g., third vector 515 in FIG. 5A). However, since the gravitational field is common, the axes corresponding to the direction of gravity may coincide, and two axes orthogonal to the direction of gravity may not coincide.

According to an embodiment, the electronic device (e.g., electronic device 210 in FIG. 2 or FIG. 4) may align the axes that do not match to compare the directions of the gaze vector 525 and the vector 515 indicating the screen direction of the electronic device. That is, the electronic device 210 may correct angle θ 930 tilted in a horizontal component to 0.

According to an embodiment, before correcting angle θ 930 to 0, the electronic device 210 may only compare the degrees of inclination with respect to the direction of gravity. The degree of inclination can be represented as a ratio between the magnitude of the horizontal component and the magnitude of the vertical component. In FIG. 9, the x-axis and y-axis may be a horizontal component, and the z-axis may be a vertical component. In this case, the degree of inclination may be represented as in Equation 4 below.

$$\text{tilt} = a\tan(\sqrt{x^2+y^2}, z) \quad [\text{Eq. 4}]$$

In a case in which the values obtained by calculating the degrees of inclination of the gaze vector 525 and the vector 515 indicating the screen direction of the electronic device 210 are expressed respectively as tilt_v and tilt_d, when the difference between the two values is within the FOV, the electronic device 210 may determine that there is a high possibility that the user is viewing the screen of the electronic device 210.

According to an embodiment, when there is a high possibility that the user is looking at the screen of the electronic device 210, the electronic device 210 may drive a sensor (e.g., camera) for gaze recognition. According to another embodiment, when there is a high possibility that the user is looking at the screen of the electronic device 210, the electronic device 210 may display necessary information on the screen of the electronic device 210.

According to an embodiment, the electronic device 210 may drive a sensor (e.g., camera) for gaze recognition only when there is a high probability that the user is looking at the screen of the electronic device 210, so that current consumption required to drive the sensor (e.g., camera) for gaze recognition can be reduced.

Figure 10A:
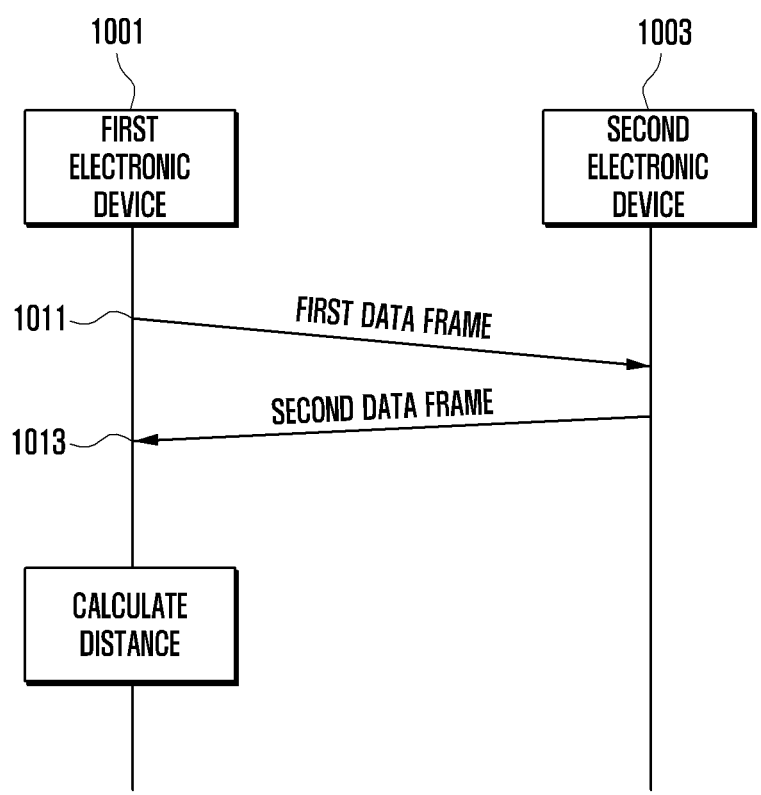
FIG. 10A illustrates a method of measuring a distance by using a UWB signal according to various embodiments.

FIG. 10A illustrates a method of measuring a distance by using a UWB signal according to various embodiments.

FIG. 10A illustrates a method in which the first electronic device 1001 transmits a first data frame (1011), the second electronic device 1003 transmits a second data frame including the time when the first data frame is received and the time when the second electronic device transmits the data frame (1013), and the first electronic device 1001 calculates the distance between the first electronic device 1001 and the second electronic device 1003 by further using the information included in the received second data frame. The first electronic device 1001 may calculate the distance to the second electronic device 1003 by subtracting the time at which the first data frame is transmitted and the time required for the second electronic device 1003 to receive the first data frame and transmit the second data frame from the time at which the second data frame is received and dividing the result by 2.

Figure 10B:
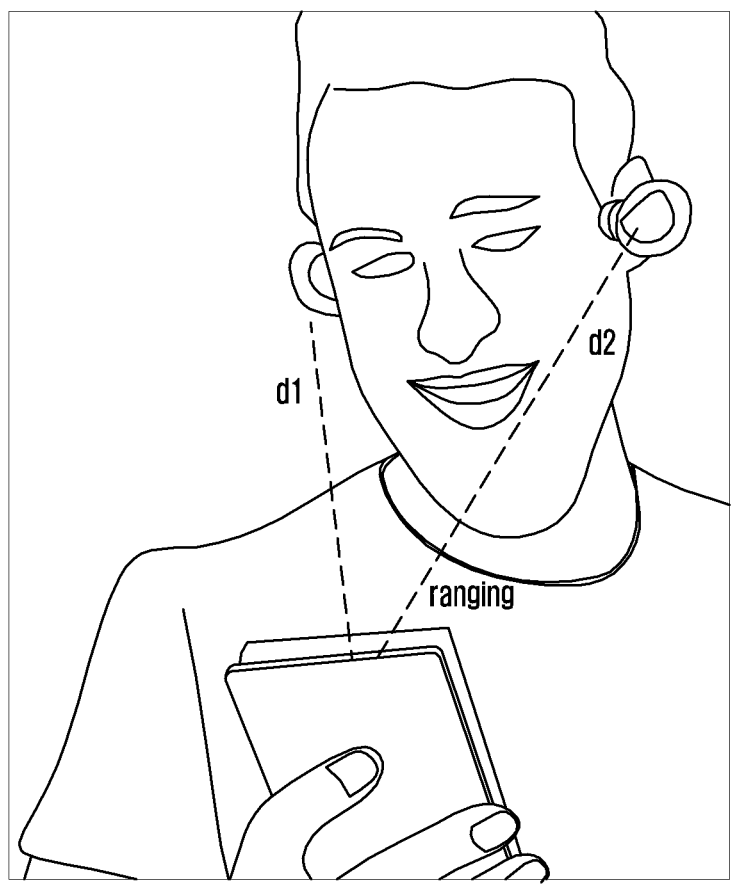
FIG. 10B illustrates a diagram in which the electronic device measures a distance to the wireless earphones by using a UWB signal according to various embodiments.

FIG. 10B illustrates a diagram in which the electronic device measures a distance to the wireless earphones by using a UWB signal according to various embodiments.

With reference to FIG. 10B, the electronic device (e.g., electronic device 210 in FIG. 2) may use a UWB signal to measure the distance d1 to the first wireless earphone (e.g., first wireless earphone 220-1 in FIG. 2) and the distance d2 to the second wireless earphone (e.g., second wireless earphone 220-2 in FIG. 2). The electronic device 210 may use a plurality of antennas to measure the direction of the first wireless earphone and the direction of the second wireless earphone based on a difference between times at which UWB signals are received.

FIGS. 10C to 10F illustrate the user's gaze direction represented using the distances and directions of the first wireless earphone and the second wireless earphone measured by the UWB communication module of the electronic device.

According to an embodiment, the electronic device (e.g., electronic device 210 in FIG. 2) may measure the distances and directions of the first wireless earphone and the second wireless earphone by using UWB signals, and may convert them into coordinate values for positions. The electronic device 210 may estimate the perpendicular bisector of a line segment connecting the coordinate values for the position of the first wireless earphone and the coordinate values for the position of the second wireless earphone as the user's gaze vector. The electronic device 210 may extend the user's gaze vector to determine whether it is within a specific region of the electronic device.

Figure 10C:
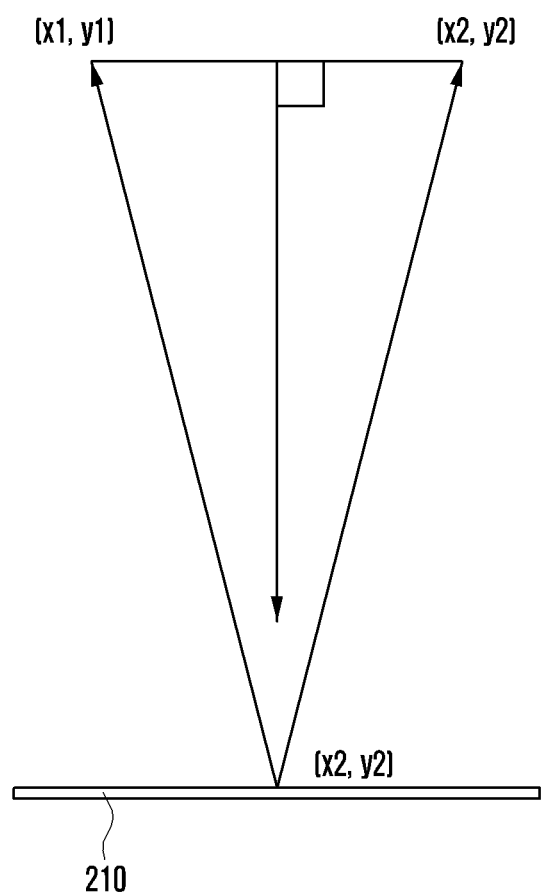
FIGS. 10C to 10F illustrate the user's gaze direction represented using the distances and directions of a first wireless earphone and a second wireless earphone measured by a UWB communication module of the electronic device.
Figure 10D:
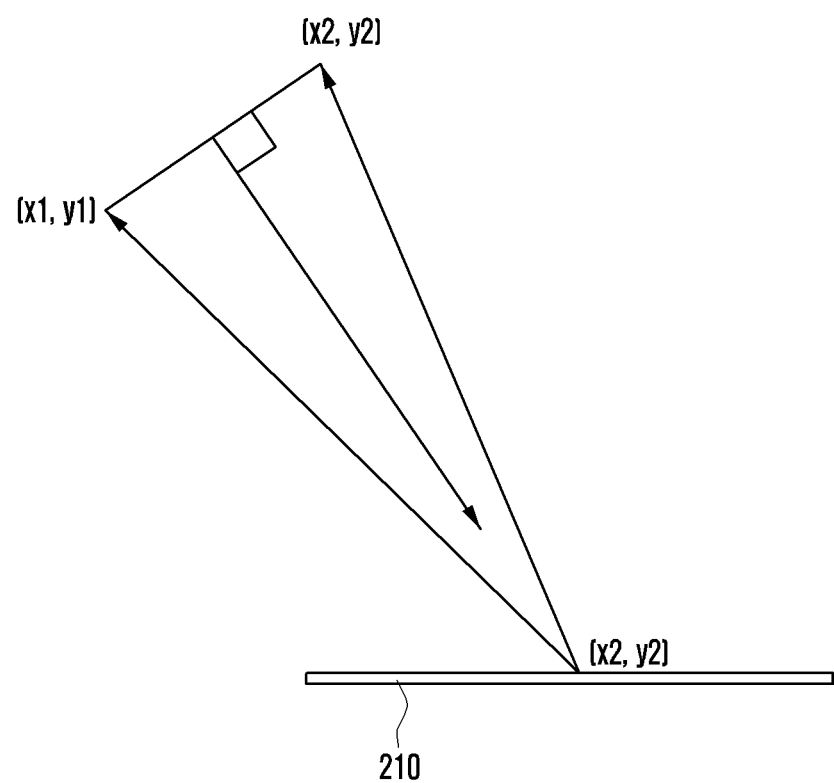

With reference to FIGS. 10C and 10D, since the user's gaze vector faces the electronic device and is within a specific region of the electronic device when extended, the electronic device 210 may determine that the user gazes at the screen of the electronic device. According to an embodiment, the electronic device 210 may further identify the position of the user's head (or face) by using the screen vector of the electronic device. FIG. 10C may illustrate the user viewing the screen of the electronic device from the front, and FIG. 10D may illustrate the user viewing the screen of the electronic device from above. Upon determining that the user is viewing the screen of the electronic device as in FIG. 10C or 10D, the electronic device may perform a preset function.

Figure 10E:
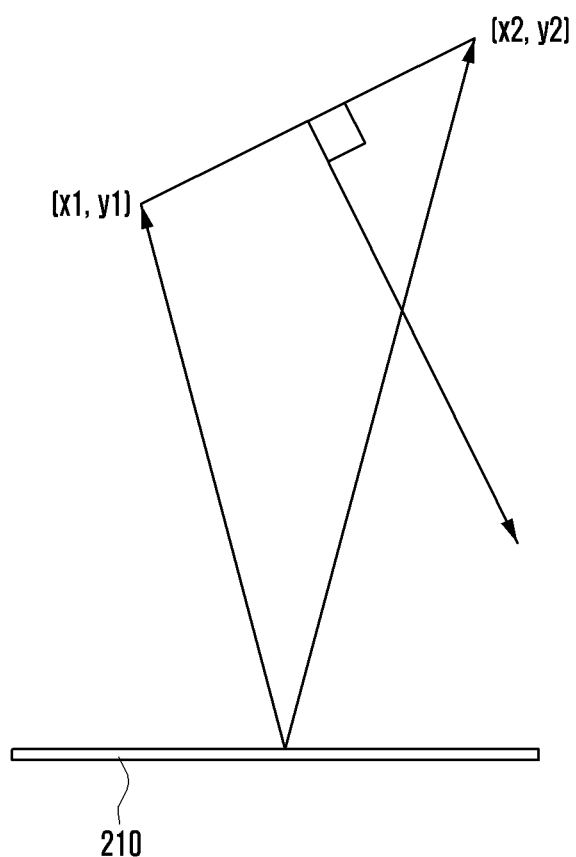
Figure 10F:
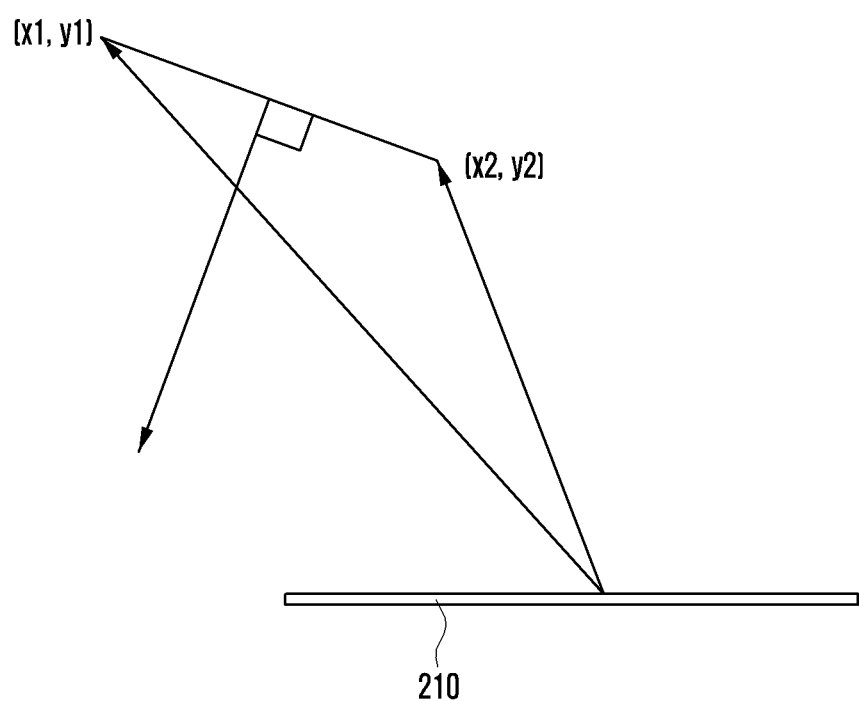

With reference to FIGS. 10E and 10F, the user's gaze vector may not face the electronic device and may be out of the range of the electronic device even if extended. When the coordinate values for the position of the first wireless earphone and the coordinate values for the position of the second wireless earphone are estimated as shown in FIG. 10E or 10F, the electronic device 210 may determine that the user does not gaze at the screen of the electronic device.

According to various embodiments of the disclosure, the electronic device (e.g., electronic device 210 in FIG. 2 or FIG. 4) may release and/or set the lock screen of the electronic device by using the face and/or gaze recognition function described above. The electronic device 210 may estimate the angle at which the user gazes at the electronic device 210. The electronic device 210 may release and/or set the lock screen of the electronic device in stages by distinguishing the angle at which the user gazes at the electronic device 210. For example, the electronic device 210 may distinguish four stages for the angle at which the user gazes at the electronic device 210: a first stage for the angle within about +10 degrees, a second stage for within about +20 degrees, a third stage for within about +30 degrees, and a fourth stage for within about +40 degrees. When being determined to be the first stage, the electronic device 210 may determine that the user gazes directly at the electronic device 210. When being determined to be the second stage, the electronic device 210 may determine that the user gazes at the electronic device 210 from the side. When being determined to be the third stage, the electronic device 210 may determine that the user is gazing at the electronic device 210 in a state where the user's face is deviated. When being determined to be the fourth stage, the electronic device 210 may determine that the user does not gaze at the electronic device 210. The electronic device 210 may prepare a function for releasing the lock screen when the angle at which the user gazes at the electronic device 210 goes from the fourth stage to the third stage. For example, the electronic device 210 may wake up the processor (e.g., AP) in sleep state, prepare to run the camera, and/or prepare to drive UWB. When the second stage is entered, the electronic device 210 may turn on the screen and display information on the lock screen. When the first stage is entered, the electronic device 210 may execute an operation and interface for authentication such as face authentication and/or iris authentication. When authentication is completed, the electronic device 210 may release the lock screen.

As another example, in case that the user is not operating the electronic device 210, the lock screen may be set when the angle at which the user gazes at the electronic device 210 goes from the first stage to the second stage, and the screen may be turned off when the angle goes to the third stage or fourth stage.

In the present disclosure, the angle at which the user gazes at the electronic device 210 is described as being divided into four stages, but it may be further or less subdivided, and the number of stages may vary according to the application.

According to various embodiments of the disclosure, the electronic device (e.g., electronic device 210 in FIG. 2 or FIG. 4) may automatically adjust the luminance and/or refresh rate of the display (or screen) of the electronic device by using the face and/or gaze recognition function described above. For example, when the user's gaze is recognized while the screen is turned on (e.g., first stage and/or second stage), the electronic device 210 may brighten the screen and/or set a high refresh rate, when the user (or, user's face) deviates from the preset FOV (e.g., third stage and/or fourth stage), the electronic device 210 may lower the screen brightness and/or set a low refresh rate. As another example, even when it goes from the first stage in which the user gazes at the electronic device 210 to the second or third stage, the electronic device 210 may maintain the display luminance regardless of the illuminance value. Even if the user and the display's gaze angle is increased, since the user can gaze with a glance view, the electronic device 210 may maintain the luminance of the display in order to preserve the viewing sensation from the side depending on the display. When the fourth stage is exited, the electronic device 210 may change the luminance of the display.

According to various embodiments of the disclosure, the electronic device (e.g., electronic device 210 in FIG. 2 or FIG. 4) may change the displayed information by using the face and/or gaze recognition function described above. When information is displayed on the screen with low power such as always on display (AOD), the electronic device 210 may display different information or adjust the amount of displayed information according to the direction of the user's head. Upon estimating that the user is not looking at the screen (e.g., fourth stage), only minimal information such as time information may be displayed, when the electronic device is recognized within the user's FOV (e.g., first to third stages), more information may be displayed.

According to an embodiment, the electronic device 210 may not display any information in the fourth stage, may display general information (e.g., weather) or whether there is a message (e.g., 0 messages) when it goes to the third or second stage, and may display personalized information (e.g., personal schedule, contact information, health information) in the first stage. Sensitive information such as financial information may be not displayed at the notification stage and can be checked after authentication. Information that can be displayed in each stage can be configured by the user.

An electronic device according to various embodiments of the disclosure may include: a sensor module, a memory, and a processor, wherein the memory may store instructions that cause the processor to: estimate the FOV of the user by using a sensor included in a wireless earphone, estimate the FOV of the electronic device by using the sensor module, compare the estimated FOV of the user with the estimated FOV of the electronic device, determine whether the user gazes at the screen of the electronic device based on the comparison result, recognize the user's gaze upon determining that the user gazes at the screen of the electronic device, and perform a specified function based on the recognized user's gaze.

The electronic device according to various embodiments of the disclosure may further include a communication module configured to establish a communication connection with the wireless earphone, and the memory may further store instructions that cause the processor to receive the FOV of the user estimated by the wireless earphone through the communication module.

In the electronic device according to various embodiments of the disclosure, the memory may further store instructions that cause the processor to: estimate the posture of the wireless earphone with data obtained using the sensor included in the wireless earphone, estimate the posture of the user's head by using the estimated posture of the wireless earphone.

In the electronic device according to various embodiments of the disclosure, the memory may further store instructions that cause the processor to estimate the user's FOV in consideration of the direction of the wireless earphone.

In the electronic device according to various embodiments of the disclosure, the user's FOV may be determined according to the function performed by the electronic device.

In the electronic device according to various embodiments of the disclosure, the memory may further store instructions that cause the processor to: measure the distance to and direction of the wireless earphone by using UWB signals, and recognize the user's gaze by using the measured distance to and direction of the wireless earphone.

In the electronic device according to various embodiments of the disclosure, the sensor module may include an acceleration sensor and a gyro sensor.

In the electronic device according to various embodiments of the disclosure, the memory may further store instructions that cause the processor to: estimate the posture of the electronic device with data obtained using a sensor included in the electronic device, and estimate the FOV of the electronic device by using the estimated posture of the electronic device.

A wireless earphone according to various embodiments of the disclosure may include: a sensor module, a memory, and a processor, wherein the memory may store instructions that cause the processor to: estimate the posture of the wireless earphone with data obtained using the sensor module, estimate the posture of the user's head by using the estimated posture of the wireless earphone, and estimate the user's FOV by using the estimated posture of the user's head.

In the wireless earphone according to various embodiments of the disclosure, the sensor module may include an acceleration sensor and a gyro sensor.

An operation method of an electronic device according to various embodiments of the disclosure may include: estimating the FOV of the user by using a sensor included in a wireless earphone, estimating the FOV of the electronic device by using a sensor included in the electronic device, comparing the estimated FOV of the user with the estimated FOV, determining whether the user gazes at the screen of the electronic device based on the comparison result, recognizing the user's gaze upon determining that the user gazes at the screen of the electronic device, and performing a specified function of the electronic device based on the recognized user's gaze.

In the operation method of the electronic device according to various embodiments of the disclosure, estimating the FOV of the user by using a sensor included in a wireless earphone may be receiving the FOV of the user estimated by the wireless earphone.

In the operation method of the electronic device according to various embodiments of the disclosure, estimating the FOV of the user by using a sensor included in a wireless earphone may include: estimating the posture of the wireless earphone with data obtained using the sensor included in the wireless earphone, estimating the posture of the user's head by using the estimated posture of the wireless earphone, and estimating the FOV of the user by using the estimated posture of the user's head.

In the operation method of the electronic device according to various embodiments of the disclosure, estimating the FOV of the user by using a sensor included in a wireless earphone may be estimating the user's FOV in consideration of the direction of the wireless earphone.

In the operation method of the electronic device according to various embodiments of the disclosure, the user's FOV may be determined according to the function performed by the electronic device.

In the operation method of the electronic device according to various embodiments of the disclosure, recognizing the user's gaze may include: measuring the distance to and direction of the wireless earphone by using UWB signals, and recognizing the user's gaze by using the measured distance to and direction of the wireless earphone.

In the operation method of the electronic device according to various embodiments of the disclosure, the sensor included in the electronic device may include an acceleration sensor and a gyro sensor.

In the operation method of the electronic device according to various embodiments of the disclosure, estimating the FOV of the electronic device by using a sensor included in the electronic device may include: estimating the posture of the electronic device with data obtained using the sensor included in the electronic device, and estimating the FOV of the electronic device by using the estimated posture of the electronic device.

An operation method of a wireless earphone according to various embodiments of the disclosure may include: estimating the posture of the wireless earphone with data obtained using a sensor, estimating the posture of the user's head by using the estimated posture of the wireless earphone, and estimating the user's FOV by using the estimated posture of the user's head.

In the operation method of the wireless earphone according to various embodiments of the disclosure, the sensor may include an acceleration sensor and a gyro sensor.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a sensor;
a memory storing instructions; and
a processor configured to execute the instructions to:
estimate a field of view (FOV) of a user by using another sensor included in a wireless earphone;
estimate a FOV of the electronic device by using the sensor;
compare the FOV of the user with the FOV of the electronic device to obtain a comparison result;
determine whether the user gazes at a screen of the electronic device based on the comparison result;
recognize a gaze of the user based on determining that the user gazes at the screen of the electronic device; and
perform a specified function based on the gaze of the user.

2. The electronic device of claim 1, further comprising a communication interface configured to establish a communication connection with the wireless earphone,
wherein the processor is further configured to execute the instructions to receive the FOV of the user estimated by the wireless earphone through the communication interface.

3. The electronic device of claim 1, wherein the processor is further configured to execute the instructions to:
estimate a posture of the wireless earphone based on data obtained using the other sensor included in the wireless earphone; and
estimate a posture of a head of the user based on the posture of the wireless earphone.

4. The electronic device of claim 1, wherein the processor is further configured to execute the instructions to estimate the FOV of the user based on a direction of the wireless earphone.

5. The electronic device of claim 1, wherein the FOV of the user is determined according to a function performed by the electronic device.

6. The electronic device of claim 1, wherein the processor is further configured to execute the instructions to:
measure, by using ultra-wideband (UWB) signals, a distance to the wireless earphone and a direction of the wireless earphone; and
recognize the gaze of the user based on the distance to the wireless earphone and the direction of the wireless earphone.

7. The electronic device of claim 1, wherein the sensor comprises an acceleration sensor and a gyro sensor.

8. The electronic device of claim 1, wherein the processor is further configured to execute the instructions to:
estimate a posture of the electronic device based on data obtained using the sensor included in the electronic device; and
estimate the FOV of the electronic device based on the posture of the electronic device.

9. A wireless earphone comprising:
a sensor;
a memory storing instructions; and
a processor configured to execute the instructions to:
estimate a posture of the wireless earphone based on data obtained using the sensor;
estimate a posture of a head of a user based on the posture of the wireless earphone;
estimate a field of view (FOV) of the user based on the posture of the head of the user;
provide the FOV of the user to an electronic device for the electronic device to determine whether the user is gazing at a screen based on a comparison of the FOV of the user and an FOV of the electronic device, recognize a gaze of the user based on a determination that the user gazes at the screen of the electronic device, and perform a specified function based on the gaze of the user.

10. The wireless earphone of claim 9, wherein the sensor comprises an acceleration sensor and a gyro sensor.

11. An operation method of an electronic device, the operation method comprising:
estimating a field of view (FOV) of a user by using a first sensor included in a wireless earphone;
estimating a FOV of the electronic device by using a second sensor included in the electronic device;
comparing the estimated FOV of the user with the estimated FOV of the electronic device;
determining whether the user gazes at a screen of the electronic device based on the comparing;
recognizing a gaze of the user based on determining that the user gazes at the screen of the electronic device; and
performing a specified function of the electronic device based on the gaze of the user.

12. The operation method of claim 11, wherein the estimating the FOV of the user comprises receiving, from the wireless earphone, the FOV of the user estimated by the wireless earphone.

13. The operation method of claim 11, wherein the estimating the FOV of the user comprises:
  estimating a posture of the wireless earphone based on data obtained using the first sensor included in the wireless earphone;
  estimating a posture of a head of the user based on the posture of the wireless earphone; and
  estimating the FOV of the user based on the posture of the head of the user.

14. The operation method of claim 11, wherein the estimating the FOV of the user comprises estimating the FOV of the user based on a direction of the wireless earphone.

15. The operation method of claim 11, wherein the FOV of the user is determined according to a function performed by the electronic device.

16. The operation method of claim 11, wherein the recognizing the gaze of the user comprises:
  measuring, by using ultra-wideband (UWB) signals, a distance to the wireless earphone and a direction of the wireless earphone; and
  recognizing the gaze of the user based on the distance to the wireless earphone and the direction of the wireless earphone.

17. The operation method of claim 11, wherein the second sensor comprises an acceleration sensor and a gyro sensor.

18. The operation method of claim 11, wherein the estimating the FOV of the electronic device comprises:
  estimating a posture of the electronic device based on data obtained using the second sensor included in the electronic device; and
  estimating the FOV of the electronic device based on the posture of the electronic device.

19. An operation method of a wireless earphone, the operation method comprising:
  estimating a posture of the wireless earphone based on data obtained using a sensor;
  estimating a posture of a head of a user based on the posture of the wireless earphone;
  estimating a field of view (FOV) of the user based on the posture of the head of the user; and
  providing the FOV of the user to an electronic device for the electronic device to determine whether the user is gazing at a screen based on a comparison of the FOV of the user and an FOV of the electronic device, recognize a gaze of the user based on a determination that the user gazes at the screen of the electronic device, and perform a specified function based on the gaze of the user.

20. The operation method of claim 19, wherein the sensor comprises an acceleration sensor and a gyro sensor.

* * * * *